United States Patent
Kamiya et al.

(10) Patent No.: US 6,387,298 B1
(45) Date of Patent: May 14, 2002

(54) LUMINESCENT MATERIALS

(75) Inventors: Akira Kamiya; Jun Zhu; Akira Watazu; Katsuyoshi Naganuma, all of Aichi (JP)

(73) Assignee: Agency of Industrial Science and Technology, Tokyo (JP)

( * ) Notice: Subject to any disclaimer, the term of this patent is extended or adjusted under 35 U.S.C. 154(b) by 3 days.

(21) Appl. No.: 09/649,575

(22) Filed: Aug. 29, 2000

(30) Foreign Application Priority Data

Aug. 31, 1999 (JP) .......................................... 11-246251

(51) Int. Cl.$^7$ .......................... C09K 11/55; C09K 11/00
(52) U.S. Cl. ......................... 252/301.4 R; 252/301.4 R
(58) Field of Search ..................... 252/301.4 R, 301.4 F

(56) References Cited

FOREIGN PATENT DOCUMENTS

JP          7-11250        1/1995

OTHER PUBLICATIONS

Loukatzikou et al, "N2O Decomposition over (CaO)1–x(MO)x oxide systems (M=Ti,Cr): Relation With Photoluminescene", J. Mater. Chem., Vol. 7 No. 8, 1997, pp. 1587–1593.*

* cited by examiner

Primary Examiner—C. Melissa Koslow
(74) Attorney, Agent, or Firm—Oblon, Spivak, McClelland, Maier & Neustadt, P.C.

(57) ABSTRACT

The present invention provides a novel orange light-emitting phosphorescent material that is non-toxic and chemically stable in air, and this invention relates to a Ti—CaO phosphorescent material, produced from a starting material of calcium oxide (CaO), or of calcium carbonate ($CaCO_3$), calcium hydroxide($Ca(OH)_2$), calcium sulfate($CaSO_4$), calcium oxalate ($CaC_2O_4$), or other compound to be converted to CaO through heating in air, by a process of bringing this starting material into contact with metallic titanium (Ti) and conducting heat treatment thereof in vacuo or in an atmosphere that is not reactive with Ti such as argon gas, or by a process of mechanical alloying and the like of CaO and Ti.

9 Claims, 5 Drawing Sheets

LUMINESCENT MATERIALS

BACKGROUND OF THE INVENTION

1. Field of the Invention

The present invention relates to a novel oxide-based phosphorescent material that emits orange light, and more particularly to a novel phosphorescent material produced from CaO and Ti.

The phosphorescent material which emits orange light of the present invention has a number of advantages as a phosphorescent material, namely, being produced easily, being chemically stable, and being highly safe.

2. Description of the Related Art

Clock dials, instrument display panels of various kinds, guide signs, and the like having light-emitting capabilities are used widely at night or in emergency situations, as well as in ordinary businesses to call the attention of workers. In the past, luminous paints containing radioactive elements were widely used for these purpose, but radiation exposure injuries were a concern, so currently a number of different luminescent and phosphorescent materials are used. Specific examples are CaS:Bi (purple-blue), CaSrS: Bi (SrS 10–20%) (blue), ZnS:Cu (yellow-green) ZnCdS:Cu (CdS 5–10%) (yellow), and ZnCdS:Cu (CdS 20–30%) (orange) and the like; however, these compounds, being sulfides, have poor chemical stability in air. Of the preceding compounds, those emitting yellow or orange light all contain cadmium, an extremely toxic element. Accordingly, the current trend is to avoid using phosphorescent materials that emit yellow or orange light.

Functional and design requirements for clock dials, instrument display panels of various kinds, guide signs, and the like have become more diverse recently. Thus, the absence of any suitable yellow or orange light-emitting phosphorescent materials represents a significant limitation, and there is an urgent need for new phosphorescent materials.

It is an objective of the present invention to meet this need by providing a novel orange light-emitting phosphorescent material.

As a result of extensive diligent research aimed at development of a novel phosphorescent material, conducted in view of the conventional art, the inventors have discovered that emission of orange phosphorescence can be achieved simply by adding Ti to CaO, and that this phenomenon can be employed to produce a novel phosphorescent material, and, therewith, have accomplished the present invention.

SUMMARY OF THE INVENTION

The present invention provides a novel phosphorescent material emitting orange light that is highly safe due to no toxicity, and chemically stable in air.

The present invention relates to a novel phosphorescent material obtained by adding Ti to CaO, that is Ti—CaO phosphorescent material, produced from a starting material of calcium oxide (CaO), or of calcium carbonate ($CaCO_3$), calcium hydroxide($Ca(OH)_2$), calcium sulfate($CaSO_4$), calcium oxalate ($CaC_2O_4$), or other compound to be converted to CaO through heating in air, by a process of bringing this starting material into contact with metallic titanium (Ti) and conducting heat treatment thereof in vacuo or in an atmosphere that is not reactive with Ti such as argon gas and the like, or by a process of mechanical alloying and the like of CaO and Ti.

The present invention employs the following technical means to solve the aforementioned problem.

(1) A phosphorescent material emitting orange light, which comprises as essential components the three elements of calcium (Ca), oxygen (O), and titanium (Ti)

(2) The phosphorescent material according to above (1), wherein the material is obtained by adding Ti to calcium oxide (CaO).

(3) The phosphorescent material according to above (2), wherein the material is obtained by adding Ti as an interstitial element into the CaO crystal lattice.

(4) The phosphorescent material according to above (2), wherein the material is obtained by adding Ti to a starting material of calcium carbonate ($CaCO_3$), calcium hydroxide($Ca(OH)_2$), calcium sulfate($CaSO_4$), calcium oxalate ($CaC_2O_4$), or other compound to be converted to CaO through heating in air.

(5) The phosphorescent material according to above (3), wherein the material is obtained by adding Ti to a starting material of calcium carbonate ($CaCO_3$), calcium hydroxide($Ca(OH)_2$ ), calcium sulfate($CaSO_4$ ), calcium oxalate ($CaC_2O_4$), or other compound to be converted to CaO through heating in air.

The phosphorescent material of the present invention is produced from a starting material of calcium oxide (CaO), or of calcium carbonate ($CaCO_3$), calcium hydroxide($Ca(OH)_2$), calcium sulfate($CaSO_4$ ), calcium oxalate ($CaC_2O_4$ ), or other compound to be converted to CaO through heating in air, by a process of bringing this starting material into contact with metallic titanium (Ti) and conducting heat treatment thereof in vacuo or in an atmosphere that is not reactive with Ti such as argon gas, or by a process of mechanical alloying and the like of CaO and Ti.

The present invention will be now described in greater detail.

The present invention is a novel phosphorescent material emitting orange light comprises calcium oxide (CaO) and Ti containing as essential components the three elements of calcium (Ca), oxygen (O), and titanium.

The CaO may be a dense or porous sinter and the like produced by fine ceramics fabrication techniques such as pressure sintering e.g., hot pressing or normal pressure sintering and the like, or it may be a powder. As the compounds to be converted to CaO through heating in air, for example, $CaCO_3$, $Ca(OH)_2$, $CaSO_4$, or $CaC_2O_4$, either alone or in combination, may be used in the form of sinter or powder or the like in place of CaO.

With respect to the metallic Ti in various forms, bulk form, e.g., sheet, foil, wire, etc. of various types, containers fabricated therefrom, e.g., a plate, board, crucible, etc., powders of various particle sizes, or thin films produced by techniques such as sputtering, may be used as the Ti. In preferred practice, substantially pure Ti is used preferably. The reason thereof is that in case of Ti alloys such as Ti—6Al—4V and the like, the alloy elements affect a specific quality of oxide film to be formed on the Ti surface, and diffusion of these alloy elements per se into the CaO competes with Ti diffusion, resulting in a drop in production efficiency relative to pure Ti when used to produce the phosphorescent material of the invention. Accordingly, while high purity is not always necessary, it is preferable to use industrial grade Ti as per JIS, specifically, Ti having JIS Grade 3 purity or higher.

The CaO—Ti phosphorescent material may be produced using, for example, a CaO sinter by bringing a sheet, wire, powder or the like of metallic Ti into contact therewith, or forming a Ti film through a technique such as deposition or sputtering, and then holding in vacuo or in an atmosphere that is not reactive with Ti such as argon gas, at a temperature of 1000° C.–1660° C. and preferably 1350° C. Where the holding temperature is above 1660° C., the Ti will melt, and this will make it difficult to separate the CaO and Ti after processing, as well as causing excessive reaction of CaO and Ti so that a $CaO.TiO_2$ complex oxide forms, resulting in failure to obtain a phosphorescent material. Where the holding temperature is below 1000°C., CaO and Ti do not react sufficiently, resulting in failure to obtain a phosphorescent material.

Where a CaO powder is used, the CaO—Ti phosphorescent material may be produced by processing in the same manner as with the CaO sinter, or by placing the powder in a metallic Ti crucible, board, or similar container, and, in the same manner as with the CaO sinter, holding in vacuo or in an atmosphere that is not reactive with Ti such as argon gas, at a temperature of 1000° C.–1660° C., and preferably 1350° C., to obtain a phosphorescent material. Alternatively, rather than employing a heat treatment like those described above, the phosphorescent material can be produced by subjecting the CaO powder and metallic Ti of some form to mechanical alloying or similar technique.

Alternatively, a CaO powder or powder compact can be stacked with a metallic Ti sheet or foil, and sintered with a hot press or the like at 1000° C.–1660° C., and preferably 1350° C., either in vacuo or in an atmosphere such as argon gas, to give a phosphorescent material.

Thus, CaO—Ti phosphorescent materials can be produced by a process of bringing metallic Ti of some form into contact with CaO of arbitrary form, subjecting these materials to heat treatment in vacuo or in an atmosphere that is not reactive with Ti such as argon gas, at a temperature of 1000° C.–1660° C., and preferably 1350° C., or by a process of subjecting the materials to mechanical alloying techniques or the like.

In either of the production processes set forth hereinabove, the CaO—Ti phosphorescent material may be produced from a starting material of $CaCO_3$, $Ca(OH)_2$, $CaSO_4$, $CaC_2O_4$, or other compound that to be converted to CaO with heating in air, rather than from CaO per se.

Phosphorescent materials obtained in this manner may be used alone, or, compounded or mixed with a medium depending on the intended use. Specifically, where used alone, such materials, in the form of sinters of various forms, may be employed in ornamentation, displays and the like of various kinds, or in powder form, may be incorporated into resins and given a desired shape. They can also be added to synthetic fiber starting materials and spun into fibers. Application in coatings, plastic materials, and the like is also possible. Various additives, such as dyes of various kinds, can, of course, also be added. Accordingly, the phosphorescent material of the invention has potential application in fields relating to industrial equipment, structural and roadway indication and ornamentation, fields relating to dress and accessories, and fields relating to various other daily necessaries and leisure goods and the like.

DESCRIPTION OF THE PREFERRED EMBODIMENTS

A fuller understanding of the invention is provided through the following examples, which are merely illustrative and should not be construed as limiting of the invention.

EXAMPLE 1

(1) Production of Phosphorescent Material

Commercially available calcium carbonate of special grade chemical was heated in air at 1200° C. to obtain CaO. This material was hot pressed for 5 minutes in an argon atmosphere at 1600° C., 500 $kgf/cm^2$ surface pressure, to obtain a CaO sinter of 98.5% relative density, 20 mm diameter, and 5 mm thickness. JIS Grade 2 purity Ti 6 mm in diameter and 5 mm thick was placed over the sinter and held for 10 minutes in an argon atmosphere at 1350° C.

(2) Results

Figure 1:
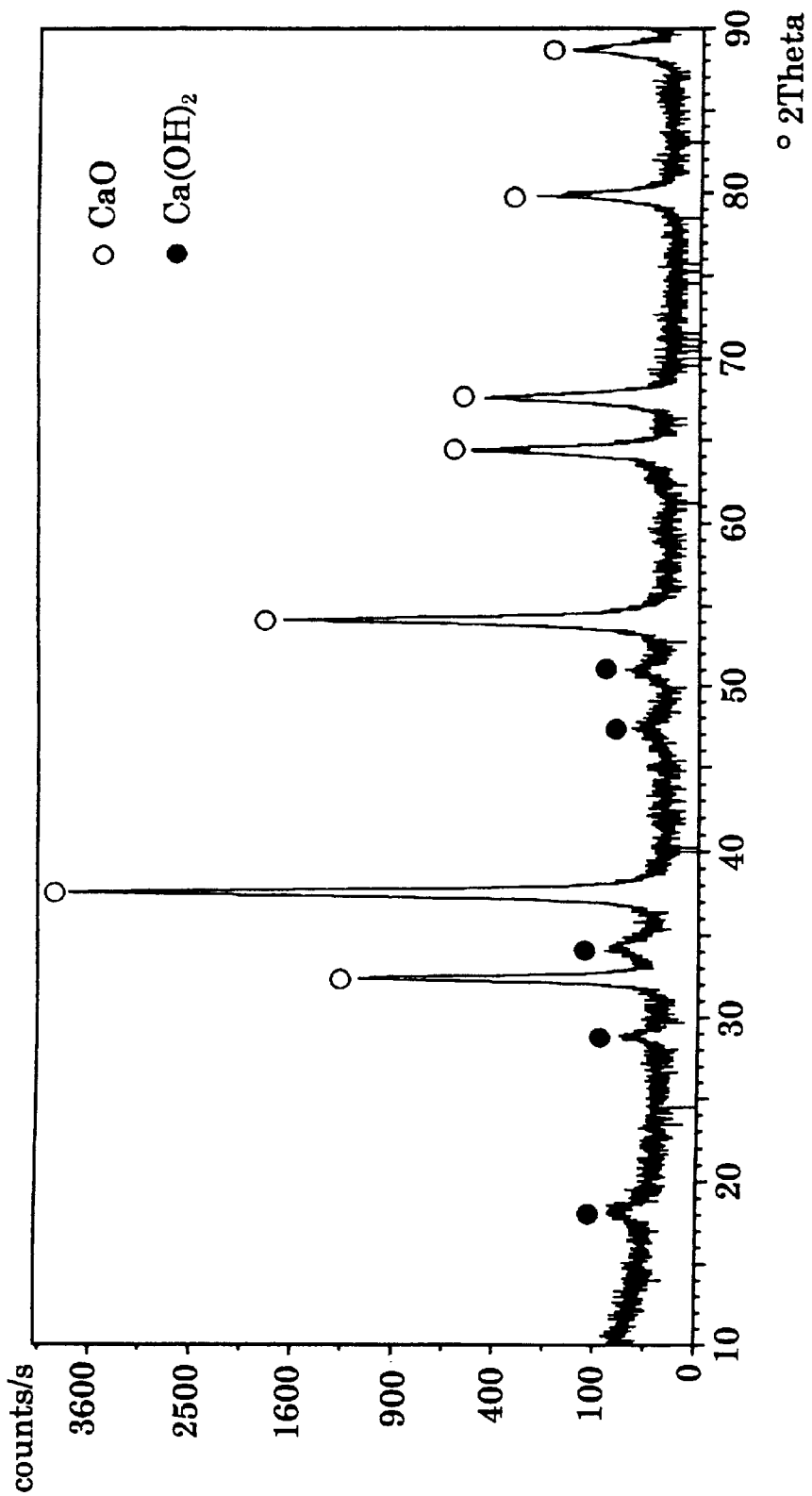
FIG. 1 shows X-ray diffraction diagram by a CuKα-ray of the phosphorescent material of the invention, wherein the vertical axis is X-ray intensity (cps) and the horizontal axis is 2 θ (deg).
Figure 2:
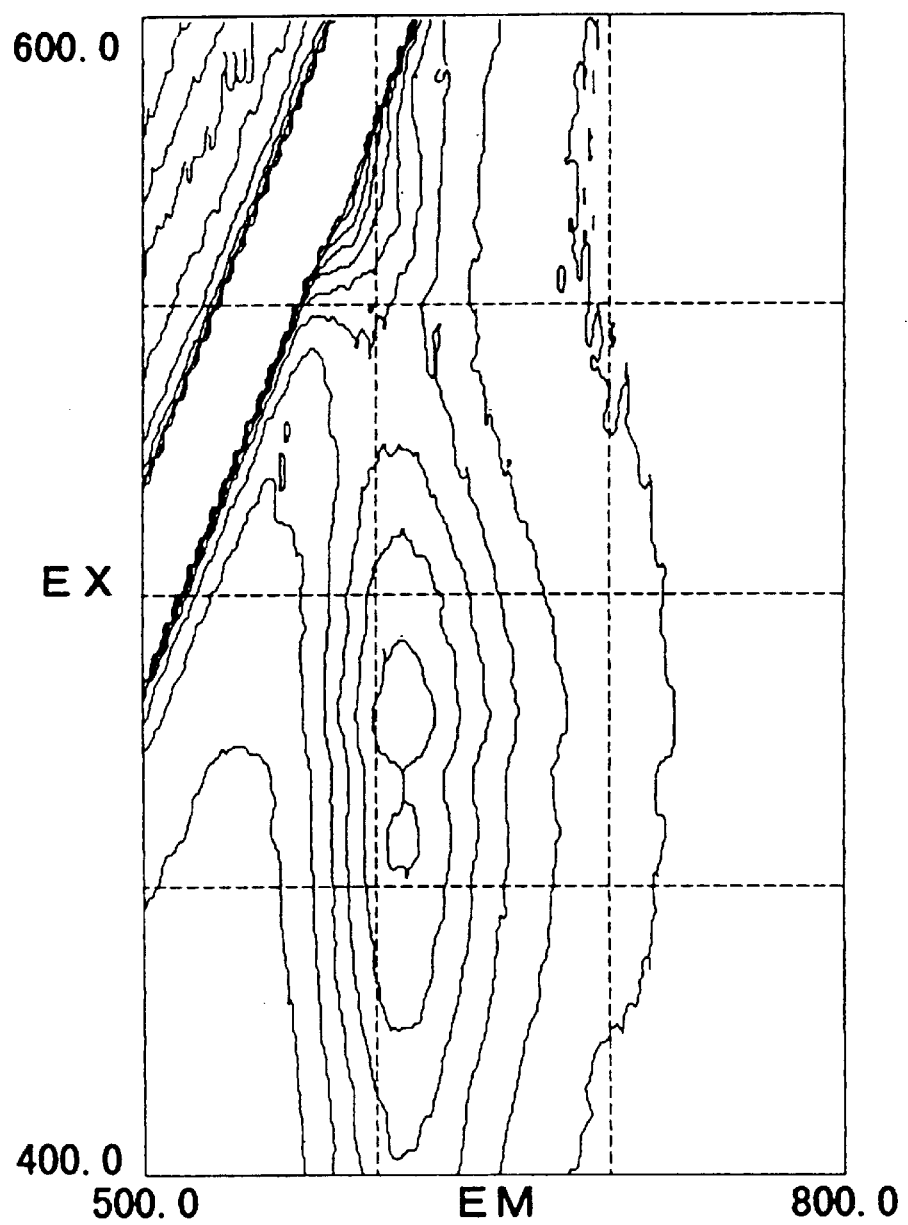
FIG. 2 shows an excitation light-emission spectrum of the phosphorescent material of the invention, wherein the vertical axis is excitation light wavelength (EX/nm) and the horizontal axis is emission light wavelength (EM/nm), where light intensity is represented in the form of a contour diagram.
Figure 3:
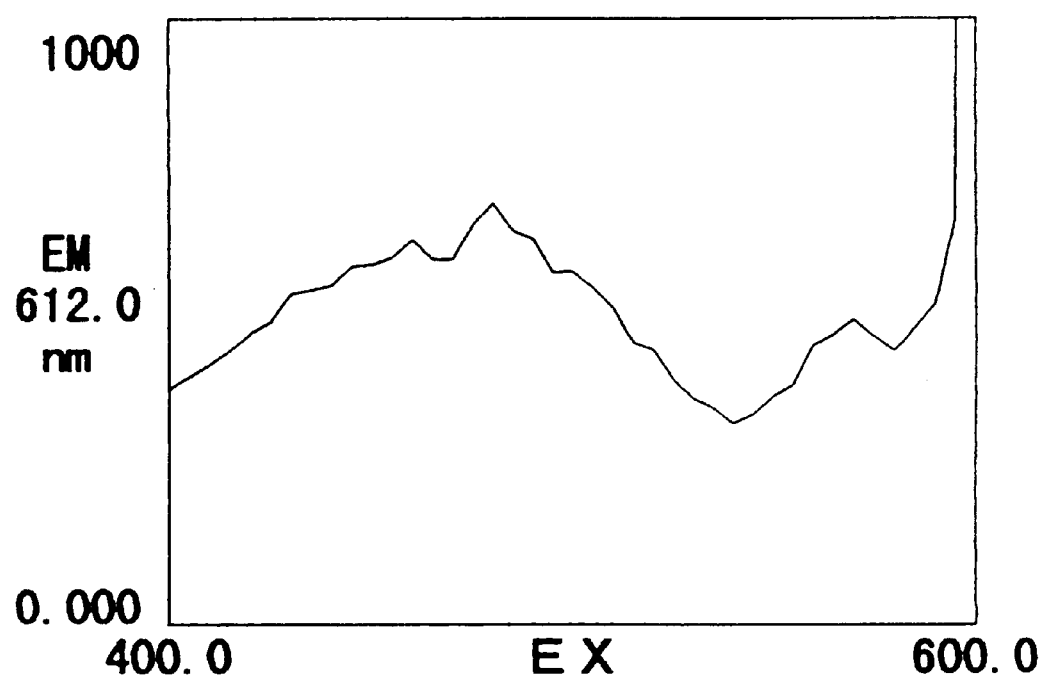
FIG. 3 shows change in intensity of luminescence of the phosphorescent material of the invention with respect to excitation light wavelength, wherein the vertical axis is emission (EM) intensity at 612 nm wavelength and the horizontal axis is excitation light wavelength (EX/nm).
Figure 4:
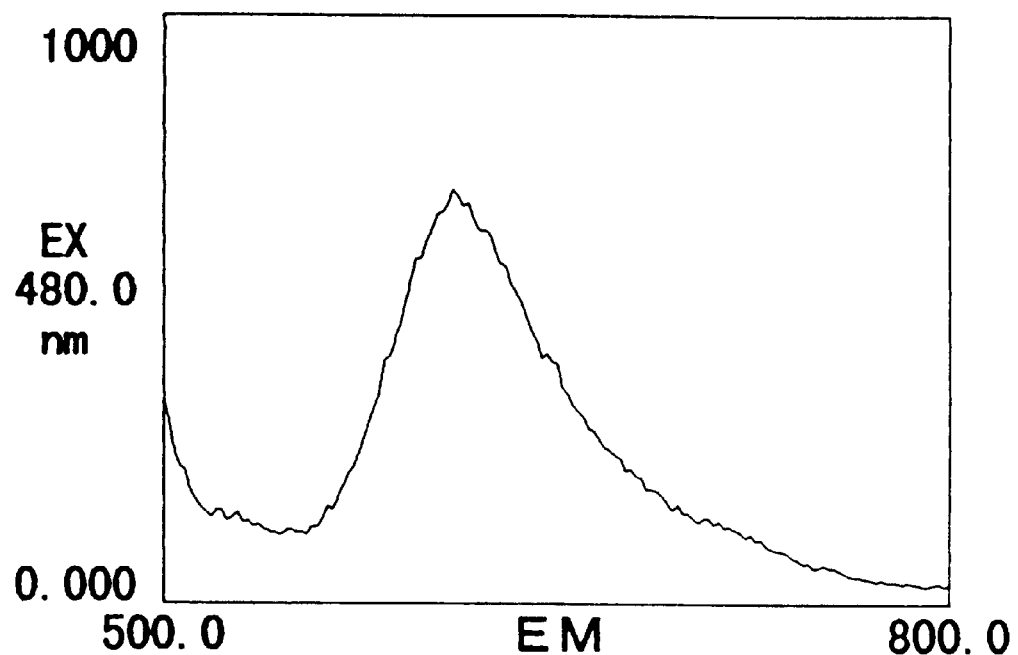
FIG. 4 shows change in intensity of luminescence of the phosphorescent material of the invention with respect to emission wavelength, wherein the vertical axis is emission intensity and the horizontal axis is emission wavelength (EM/nm), where excitation light (EX) wavelength of 480 nm was used.
Figure 5:
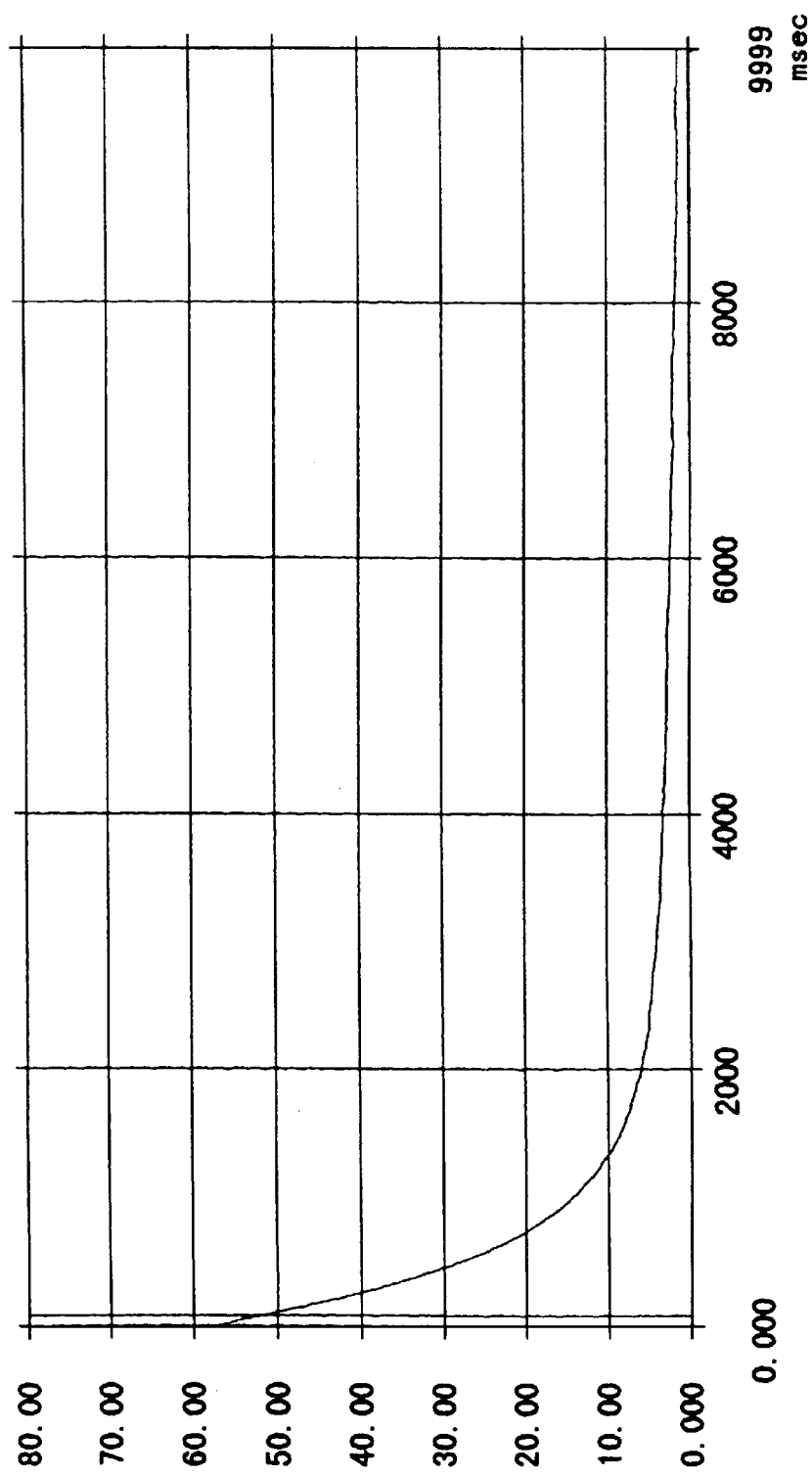
FIG. 5 gives the results of measurements of phosphorescence attenuation behavior of the phosphorescent material of the invention, wherein the vertical axis is relative intensity of light and the horizontal axis is elapsed time (msec), where the phosphorescence was measured in the condition that excitation light wavelength is 480 nm, photomul tiplier voltage is 700 V, irradiation time is 2 seconds, and phosphorescence wavelength is 650 nm.

The portion that had been in contact with the Ti discolored to light yellow and had become to emit orange phosphorescence. The X-ray diffraction diagram by CuK α-ray thereof is given in FIG. 1 and excitation lightemission spectra in FIGS. 2–4. From FIG. 1 it will be apparent that the material has the same crystal structure as CaO. A more detailed examination showed that crystal lattice size was slightly larger than pure CaO. From FIG. 2 it will be apparent that the excitation light wavelength of the material is about 425–480 nm and the phosphorescence wavelength is about 612 nm. When the material was dissolved in dilute hydrochloric acid and subjected to elemental analysis by ICP emission analysis, it was found that material contained principally the elements Ca and O, plus 10 ppm Ti as a trace element. Accordingly, this material is a CaO crystal containing interstitial Ti in solid solution. Attenuation of phosphorescence by the material is shown in FIG. 5. The time required for initial attenuation of luminous energy by 1/e was 850 msec.

EXAMPLE 2

A sheet of JIS Grade 2 purity Ti 18 mm in diameter and 0.5 mm thick was buried in CaO powder prepared as in EXAMPLE 1, and the materials were hot pressed for 5 minutes in an argon atmosphere at 1350° C., 500 $kgf/cm^2$ surface pressure, to obtain a CaO sinter of 94.5% relative density, 20 mm diameter, and 5 mm thickness, containing the Ti sheet completely embedded in its center.

The resultant sinter had a light yellow color overall, and had phosphorescence identical to that in EXAMPLE 1.

EXAMPLE 3

5 g of CaO powder prepared as in EXAMPLE 1 was packed into a crucible 25 mm in diameter and 10 mm deep consisting of JIS Grade 2 purity Ti, and the materials were held for 3 hours in an argon atmosphere at 1350° C.

The resultant powder was a light yellow color, and had phosphorescence identical to that in EXAMPLE 1. ICP emission analysis showed that it contained 10 ppm Ti.

EXAMPLE 4

20 g of CaO powder prepared as in EXAMPLE 1 was placed in graphite crucible together with four Ti rods 5 mm in diameter and 15 mm long consisting of JIS Grade 2 purity Ti, and the materials were held for 1 hour in an argon atmosphere at 1350° C.

The resultant powder was ash color, but had phosphorescence identical to that in EXAMPLE 1. ICP emission analysis showed that it contained 15 ppm Ti. Secondary-ion mass spectroscopy (SIMS) showed that it contained about 0.1% carbon.

EXAMPLE 5

10 g of CaO powder prepared as in EXAMPLE 1 was packed into a gas-exchangeable SUS 304 stainless steel container (500 cm$^3$ capacity) together with four pieces of 5 mm-diameter JIS Grade 2 purity Ti rod cut to 5 mm thickness, and agitated at 250 rpm for 1 hour in an argon atmosphere using a planetary ball mill (LA-P01 produced by KK Ito Seisakusho).

After processing, the powder separating the Ti rods was ash color, but had phosphorescence identical to that in EXAMPLE 1. ICP emission analysis showed that it contained 15 ppm Ti.

Comparative Examples

Comparative examples are given below.

Comparative Example 1

Processing was performed under the same conditions as in EXAMPLE 1, except for changing the holding temperature to 1660° C. The entire surface of the CaO sinter was covered by molten Ti, making it impossible to remove the Ti after processing, or to obtain a phosphorescent material.

Comparative Example 2

Processing was performed under the same conditions as in EXAMPLE 1, except for changing the holding temperature to 1000° C. The Ti and CaO did not react sufficiently, making it impossible to obtain a phosphorescent material.

As described in the above, there is no material suitable for practical use in the conventional art, however, according to the present invention, there is now provided a novel phosphorescent material which emits orange light capable for putting the material to practical use. This novel phosphorescent material is readily produced from CaO and Ti, and in the form of a sinter can be given various shapes for use in ornamentation, displays and the like of various kinds; or in powder form, may be compounded or mixed with a medium for various use. Specifically, the phosphorescent material can be applied in the fields of fibers, coatings, plastic materials, and the like. Accordingly, the phosphorescent material can be utilized in a variety of commercial applications.

What is claimed is:

1. A phosphorescent material capable of emitting orange light, which comprises CaO with Ti as an interstitial element therein.

2. The phosphorescent material according to claim 1, wherein said material is obtained by adding Ti to CaO, heating the mixture in vacuo or in an atmosphere that is not reactive with Ti at a temperature sufficient form said phosphorescent material or by a process of mechanical alloying of said mixture to produce CaO with Ti as an interstitial element.

3. The phosphorescent material according to claim 2, wherein a solid solution is formed.

4. The phosphorescent material according to claim 2, wherein said CaO is obtained by heating in air a compound selected from the group consisting of $CaCO_3$, $Ca(OH)_2$, $CaSO_4$, $CaC_2O_4$, other compound(s) convertible to CaO by heating in air, or mixtures thereof.

5. The phosphorescent material according to claim 2, wherein said heating is in vacuo.

6. The phosphorescent material according to claim 2, wherein said heating is in an atmosphere that is not reactive with Ti.

7. The phosphorescent material according to claim 2, wherein mechanical alloying is carried out.

8. The phosphorescent material according to claim 2, wherein said heating is carried out at a temperature of 1,000° C.–1660° C.

9. The phosphorescent material according to claim 2, wherein said heating is carried out at a temperature of 1350° C.

* * * * *